(12) United States Patent
Bregger (10) Patent No.: US 9,954,761 B2
(45) Date of Patent: Apr. 24, 2018

(54) DYNAMIC DETECTION OF VPN SITES

(71) Applicant: Arbor Networks, Inc., Burlington, MA (US)

(72) Inventor: Matthew Bregger, Saline, MI (US)

(73) Assignee: Arbor Networks, Inc., Burlington, MA (US)

(*) Notice: Subject to any disclaimer, the term of this patent is extended or adjusted under 35 U.S.C. 154(b) by 252 days.

(21) Appl. No.: 14/737,294

(22) Filed: Jun. 11, 2015

(65) Prior Publication Data

US 2016/0366043 A1 Dec. 15, 2016

(51) Int. Cl.

| | |
|---|---|
| *H04L 12/751* | (2013.01) |
| *H04L 12/46* | (2006.01) |
| *H04L 12/24* | (2006.01) |
| *H04L 12/66* | (2006.01) |
| *H04L 29/06* | (2006.01) |

(52) U.S. Cl.
CPC .............. *H04L 45/02* (2013.01); *H04L 12/46* (2013.01); *H04L 12/462* (2013.01); *H04L 12/4625* (2013.01); *H04L 12/4641* (2013.01); *H04L 12/66* (2013.01); *H04L 41/12* (2013.01); *H04L 63/0272* (2013.01)

(58) Field of Classification Search
None
See application file for complete search history.

(56) References Cited

U.S. PATENT DOCUMENTS

| 8,117,338 | B2 | 2/2012 | Ould-Brahim | |
|---|---|---|---|---|
| 8,750,099 | B2* | 6/2014 | Patel | H04L 45/04 370/225 |
| 2002/0191541 | A1* | 12/2002 | Buchanan | H04L 12/4641 370/230 |
| 2005/0091482 | A1* | 4/2005 | Gray | H04L 41/5058 713/151 |
| 2006/0209682 | A1* | 9/2006 | Filsfils | H04L 45/04 370/219 |
| 2007/0280241 | A1* | 12/2007 | Verma | H04L 12/4641 370/392 |
| 2015/0195105 | A1* | 7/2015 | Zhuang | H04L 12/4641 370/254 |

* cited by examiner

*Primary Examiner* — Kibrom T Hailu
(74) *Attorney, Agent, or Firm* — Locke Lord LLP; Scott D. Wofsy; Christopher J. Capelli (57) ABSTRACT

A method for automatically detecting and configuring Virtual Private Network (VPN) sites is provided. A Border Gateway Protocol (BGP) message is received from a Provider Edge (PE) router. The BGP message includes one or more attributes. The VPN site is identified based on the one or more attributes. Such attributes may include extended community attributes.

9 Claims, 4 Drawing Sheets

DYNAMIC DETECTION OF VPN SITES

FIELD OF THE INVENTION

Embodiments of the present invention relate to Virtual Private Networks (VPNs) and, more particularly, to dynamic detection of VPN sites.

BACKGROUND OF THE INVENTION

VPNs typically provide cost-effective means for conducting voice and data communications between, for example, corporate data centers, remote offices, mobile employees, customers, suppliers, and business partners. In general, a VPN is a private network configured within a public network, such as a service provider's network or the Internet. The VPN of a given customer appears privately dedicated to that customer, when in actuality the customer's VPN shares the same physical backbone with the VPNs of many other customers.

Implementing a Multiprotocol Label Switching (MPLS)-based VPN generally requires the distribution of certain routing information between provider edge (PE) routers of the service provider's network. A commonly used inter-domain routing protocol for exchanging such routing information is the Border Gateway Protocol, or BGP. For example, using BGP messages, PE routers exchange VPN routes with customer edge (CE) routers and with other routers in the service provider's network.

Typically, a user needs to manually configure network monitoring tools for all VPN sites. While this will work for small numbers of VPNs, this solution is not scalable and may be difficult to implement or administer for large number of VPNs.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for automatically detecting Virtual Private Network (VPN) sites is provided. A Border Gateway Protocol (BGP) message is received from a Provider Edge (PE) router. The BGP message includes one or more attributes. The VPN site is identified based on the one or more attributes.

In another aspect, a computer program product for automatically detecting VPN sites is provided. The computer program product comprises one or more computer-readable storage devices and a plurality of program instructions stored on at least one of the one or more computer-readable storage devices. The plurality of program instructions includes program instructions to receive a BGP message from a PE router. The BGP message includes one or more attributes. The plurality of program instructions further includes program instructions to identify the VPN site based on the one or more attributes.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Communications networks constructed in accordance with embodiments of the invention use BGP as an auto-discovery mechanism to support the auto configuration of a plurality of VPNs by a network management platform. Auto-discovery is a mechanism by which a given provider edge PE router finds other PE routers participating in the same VPN. Examples of supported VPN applications that use BGP as an auto-discovery mechanism—referred to herein as BGP-VPN applications—include, but are not limited to, BGP/MPLS IP VPNs (RFC 2547, RFC 4364, VPLS-BGP, VPLS-LDP (Label Distribution Protocol) using BGP, L2VPN using BGP, and multi-segment pseudo wire using BGP.

In brief overview, PE routers of a service provider (SP) network typically exchange BGP messages to advertise VPN routes through the SP network. In particular, certain fields of these BGP messages carry routing information that enables the PE routers to associate certain routes with a particular VPN. In one embodiment, this association can be determined directly from the routing information carried in the BGP messages.

Figure 1:
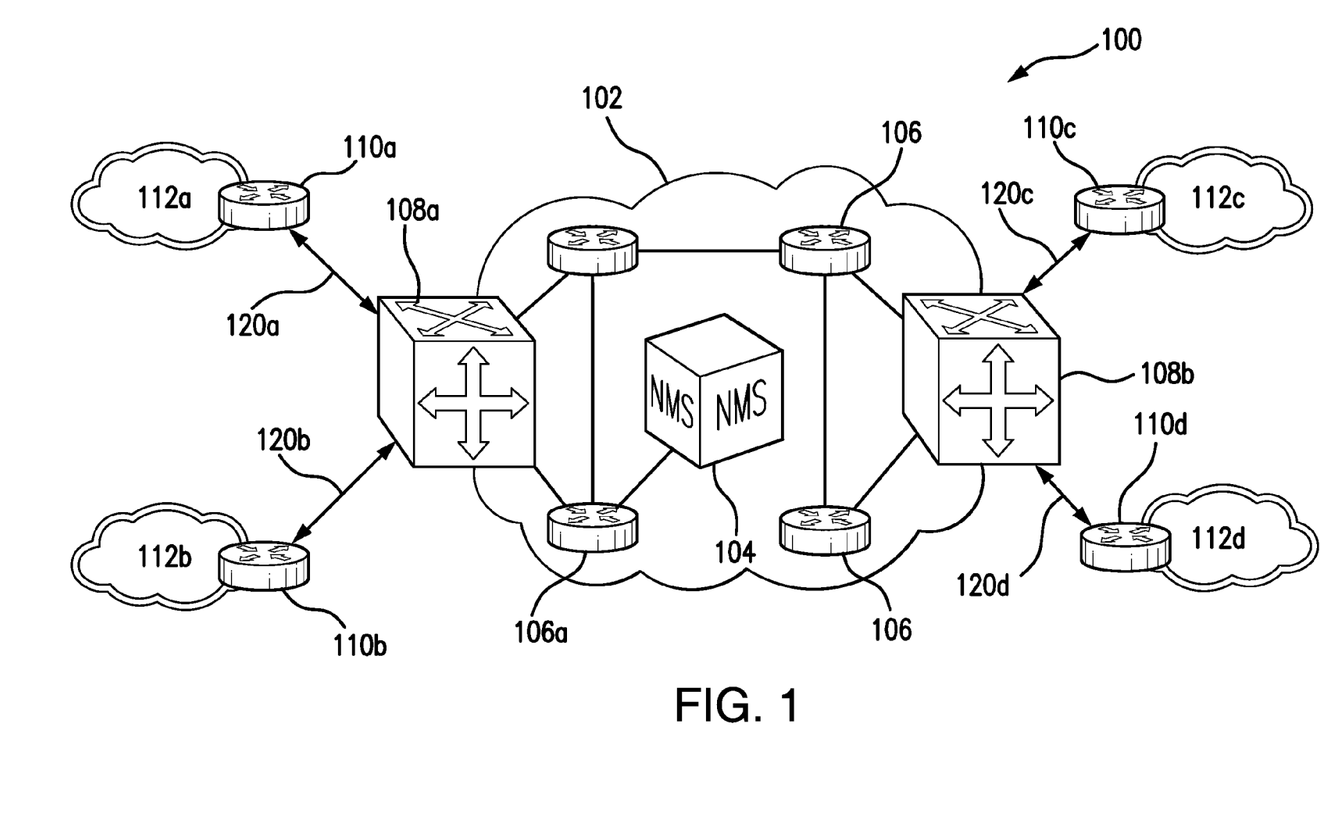
FIG. 1 is a block diagram representation of a simplified communications network that includes PE routers in accordance with an embodiment of the invention.

FIG. 1 shows an embodiment of an exemplary communications network 100 in which the principles of the invention may be practiced. The communications network 100 includes one or more customer sites or networks 112a, 112b, 112c, 112d (generally, 112) in communication with a packet-switched network (PSN) 102. Each customer site 112a, 112b, 112c, 112d includes a customer edge (CE) router 110a, 110b, 110c, 110d (generally, 110), respectively.

The PSN 102 corresponds to a network domain managed by a service provider (or by multiple service providers that contract to support a VPN service). The PSN 102 includes first and second provider edge (PE) routers 108a, 108b (generally, 108). In general, a PE router 108 is a network element—also referred to as a device or as a node—that communicates with one or more CE routers 110. For example, the first PE router 108a is in communication with CE router 110a and CE router 110b, while the second PE router 108b is in communication with CE router 110c and CE router 110d. While only two PE routers 108 are shown in FIG. 1 for ease of illustration, typically, the PSN 102 can include any number of PE routers 108.

Customers (i.e., owners of the customer sites 112) obtain VPN services from the service provider. Examples of customers include, but are not limited to, Internet Service Providers (ISP), an enterprise, a group of enterprises, an application service provider, and other service providers of VPN services. BGP-VPN applications can originate or terminate (or both) at the CE sites 112. The BGP-VPN applications supported by the customer site 112a can be the same as or different from those supported by the customer site 112d. In addition, a given customer site 112 can be in more than one VPN (intranet and one or more extranets).

Each CE router 110a, 110b, 110c, 110d is in communication with the first PE 108a and the second PE 108b over respective links (i.e., attachment circuits) 120a, 120b, 120c, 120d. Generally, an attachment circuit is part of a user-to-network interface between a PE router 108 and a CE router 110 and comprises a physical or logical link configured for the particular technology of the network service. Example embodiments of attachment circuits include, but are not limited to, a frame relay DLCI (data link connection identifier), an ATM VPI/VCI (virtual path identifier/virtual channel identifier), an Ethernet port, a VLAN (virtual LAN), an HDLC (high-level data link control) link, a PPP (point-to-point protocol) connection on a physical interface, a PPP session from an L2TP (Layer 2 tunneling protocol) tunnel, and an MPLS LSP (label switch path).

Before data associated with a BGP-VPN application can traverse the PSN 102, the PE routers 108 need to learn the route belonging to the given VPN. In one embodiment, the service provider uses the Multi-protocol Border Gateway Protocol (MP-BGP), described in RFC 2858, to cause distribution of VPN routing information to the routers 106, 108 that are in the VPN. Accordingly, each such PE router 108 is a MP-BGP network device that runs MP-BGP.

As previously noted, BGP-enabled PE routers 108 perform various routing functions, including transmitting and receiving BGP messages and rendering routing decisions based on BGP routing policies. Each PE router 108 typically maintains a local BGP routing table that lists feasible routes to reachable (i.e., accessible) network nodes and subnetworks. Periodic refreshing of the BGP routing table is generally not performed. However, the PE routers 108 do exchange routing information under certain circumstances. For example, when a PE router 108 initially connects to the network, the PE router 108 receives the entire contents of the BGP routing tables of its peers, i.e., its adjacent PE routers 108. Thereafter, when the contents of a PE router's 108 BGP table changes, the PE router 108 transmits only the changed portions of its BGP table to its peers which, in turn, update their local BGP tables. A BGP update message is thus an incremental update message sent in response to changes to the contents of the BGP routing table. Routing updates provided by the BGP update messages allow a set of interconnected PE routers 108 to construct a consistent view of the network topology. BGP update messages are typically sent using a reliable transport protocol, such as TCP, to ensure their reliable delivery.

Each BGP update message includes network layer reachability information (NLRI) that specifies a list of address prefixes whose reachability information has changed. The BGP update message also may include one or more BGP attributes that are associated with the NLRI address prefixes. For instance, the update message may include a "Next Hop" attribute to indicate which PE router 108 should be used as the next hop to reach the address prefixes listed in the NLRI.

BGP update messages may include one or more BGP community attributes or extended community attributes. As defined in RFC 1997, a BGP community is a group of destinations which share some common property. By default, all routes belong to an Internet community. BGP extended community attributes provide added flexibility over existing BGP community attributes. In particular, BGP extended communities typically include a "type" field that may be used to differentiate additional types of BGP communities beyond those already supported by the conventional BGP community attribute.

One of the extended community attributes supported by BGP, called route target community, is used by PE routers 108 to control which VPN routes they accept. Each VPN has a unique route target value, and each advertised VPN route in a BGP update message includes a route target, indicating to which VPN (or group of customer sites) the VPN route belongs. A given PE router 108 keeps track of those route targets associated with the VPNs that the PE router 108 carries, accepting those advertised routes having a matching route target and ignoring those that do not.

According to embodiments of the present invention, a Network Management System (NMS) 104 may be used to monitor and control devices within the PSN network 102. In an embodiment, NMS 104 is communicatively coupled to one of the routers in provider network 102, such as router 106a. An administrator or technician uses NMS 104 to monitor and control devices within the network 102. A typical NMS 104 manages network infrastructure elements such as routers 106-108, which are also denoted managed devices. In various embodiments the managed devices may comprise routers 106 and 108, or computers, terminal servers, printers or any other devices that are connected to network 102. The NMS system 104 includes a computer having a processor and memory for storing instructions (shown in FIG. 4). The memory can be any type of memory or other computer readable media that stores instructions that are executed by the processor. A computer readable storage medium may be, for example, but not limited to, an electronic, magnetic, optical, electromagnetic, infrared, or semiconductor system, apparatus, or device, or any suitable combination of the foregoing. Generally speaking, NMS 104 can be any type of computer or other computing device containing computer executable program instructions to allow data communication with other elements of the PSN network 102 and containing computer executable program instructions to carry out the method described herein.

As previously indicated, NMS 104 monitors network 102. NMS 104 may query, receive data from, store configuration information and other data for and send communication to network 102. In one embodiment, NMS 104 may maintain a collection of managed objects. A managed object is a characteristic of a managed device. Examples include device identifier, operating system version, interface configuration attributes, etc. In an embodiment, one of the collections managed by NMS 104 may include VPN managed objects. VPN managed objects track traffic that is part of a MPLS VPN and are measured at the PE routers 108, where the traffic enters the VPN. A VPN managed object is defined by one or more boundary interfaces that are defined by the user. A VPN managed object can contain one or more VPN Sites. In an embodiment of the present invention, advantageously, NMS 104 may be configured to automatically keep the configuration of the VPN sites in sync with their network configuration as described below. The term "automatically," as used herein, generally means that the appropriate processing is substantially performed by NMS 104.

Figure 2:
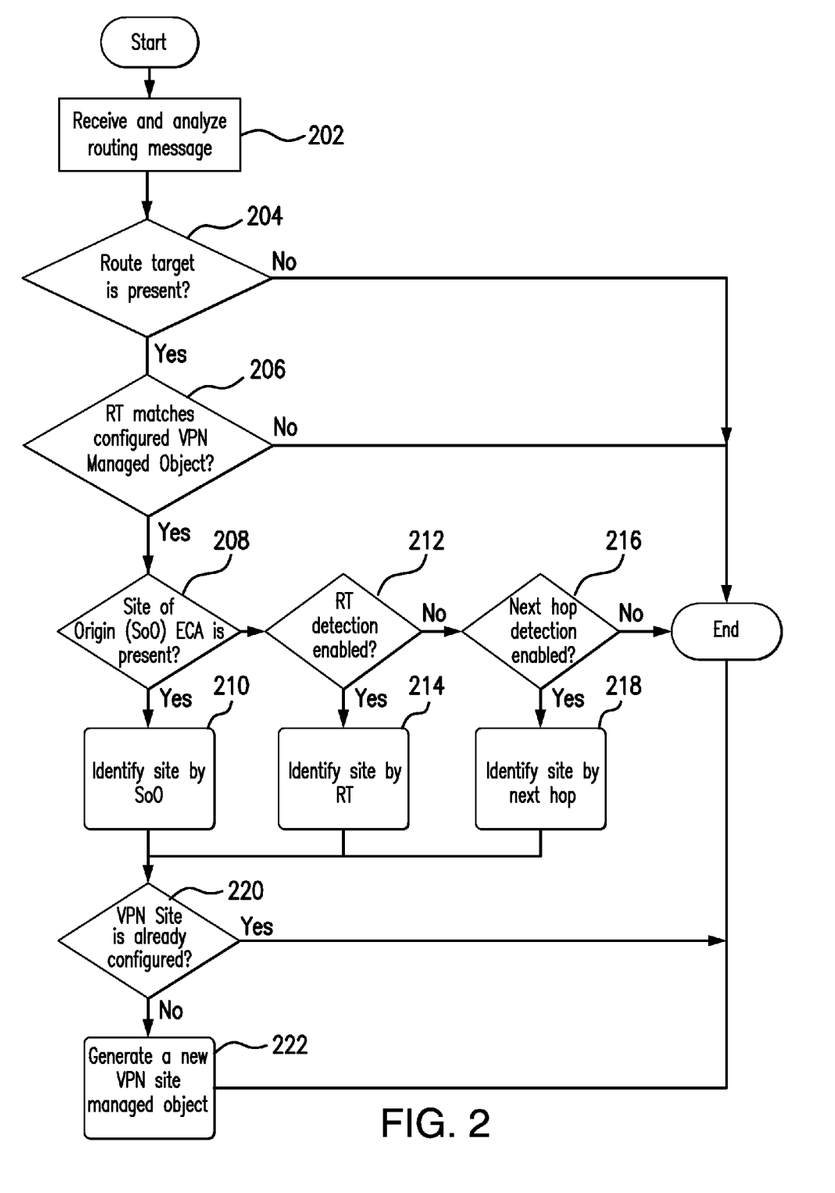
FIG. 2 is a flowchart of operational steps of the network management system of FIG. 1, in accordance with an illustrative embodiment of the present invention.

FIG. 2 is a flowchart of operational steps of the NMS 104 of FIG. 1, in accordance with exemplary embodiments of the present invention. Before turning to description of FIG. 2, it is noted that the flow diagram in FIG. 2 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

It is contemplated that various routing messages can propagate across the exemplary communications network 100 illustrated in FIG. 1. In one embodiment, the BGP messages (such as updates) can be seen to propagate across the BGP-speaking routers as a kind of wave front traveling across the network 100 topology. At step 202, NMS 104 receives a BGP message from a PE router 108. As previously noted, BGP update messages may include one or more BGP community attributes or extended community attributes. Thus, at step 202, NMS 104 can further determine a type of an extended community attribute present in the received message.

Some networks configure each site 112 with a unique BGP route target extended community. The extended community attribute can signify a route target community, as defined in RFC 4360. The route target extended community attribute is typically used to define the routing policies which determine VPN topologies. According to an embodiment of the present invention, at step 204, NMS 104 determines whether the present extended community attribute signifies a route target community which determines the VPN membership. An exemplary data structure for a BGP extended communities attribute is described below in conjunction with FIGS. 3A and 3B. In response to determining that the extended community attribute signifies a route target community (decision block 204, yes branch), at step 206, NMS 104 analyzes a collection of previously configured managed objects. For instance, NMS 104 may analyze the collection of VPN managed objects to determine if it already contains a VPN managed object matching the target route identified in the extended community attribute. Thereafter, if at decision block 206 NMS 104 determines a match was found, at step 208, NMS 104 determines whether the present extended community attribute comprises a site of origin attribute. The site of origin extended community is a BGP extended community attribute that is used to identify routes that have originated from a site so that the re-advertisement of that prefix back to the source site can be prevented. Advantageously, the site of origin extended community uniquely identifies the site from which a router, such as PE router 108, has learned a route. Thus, if NMS 104 determines that the site of origin is present in the received BGP message (decision block 208, yes branch), at step 210, NMS 104 identifies the VPN site based on the site of origin extended community attribute.

According to an embodiment of the present invention, if the extended community attribute is present but does not specify a site of origin (decision block 208, no branch), at step 212, NMS 104 determines whether distributed intelligent mechanisms residing in the network 100 have been enabled to utilize a route target detection mechanism. As previously noted, the route target extended community attribute is typically used to define the routing policies which determine VPN topologies and can be used to determine the VPN membership. Accordingly, in response to determining that the network 100 has been configured to utilize the route target detection mechanism (decision block 212, yes branch), at step 214, NMS 104 identifies the VPN site based on the route target extended community attribute.

According to an embodiment of the present invention, if the network 100 has not been configured to utilize the route target detection mechanism (decision block 212, no branch), at step 216, NMS 104 determines whether distributed intelligent mechanisms residing in the network 100 have been enabled to utilize a next hop detection mechanism. When a PE router 108 receives updates from multiple sites that describe different paths to the same destination, the PE router 108 chooses a single best path for reaching that destination (prefix). Once chosen, the PE router 108 uses BGP to propagate that best path to its neighbors. The decision is based on the value of attributes, such as next-hop, contained in a BGP update message and other BGP-configurable factors. In this context, the BGP next-hop attribute is the network address of the next hop (neighbor) used to reach the destination prefix. More specifically, each route advertised by BGP typically must have a next hop address that is reachable in order for that route to be considered valid. That is, a valid BGP route typically should contain an attribute (such as a BGP next-hop address) that, in turn, should exist in the routing table of the router. In response to determining that the network 100 has been configured to utilize the next hop detection mechanism (decision block 216, yes branch), at step 218, NMS 104 identifies all routes having matching next hop attribute. It is noted that all routes that share the same next hop belong to the same VPN site. For example, routes to sites within a particular VPN may be advertised with the firewall node as the next hop, so that all communications are routed via the firewall.

After the VPN site has been identified (at step 210 or 214 or 218), at step 220, NMS 104 determines whether the identified VPN site has been already configured based on the stored network configuration information. Advantageously, if the identified VPN site has not been configured yet (decision block 220, no branch), at step 222, NMS 104 automatically generates a new VPN site managed object that matches one of the extended community attributes utilized for identifying the VPN site. For example, in networks where the site of origin extended community attribute is used, the new VPN site managed object is generated that matches the site of origin extended community attribute included in the received BGP message. As an alternative example, the next hop attribute included in the received BGP message may be utilized to generate the new VPN site managed object if that VPN site was identified at step 218 using the next hop attribute.

Figure 3A:
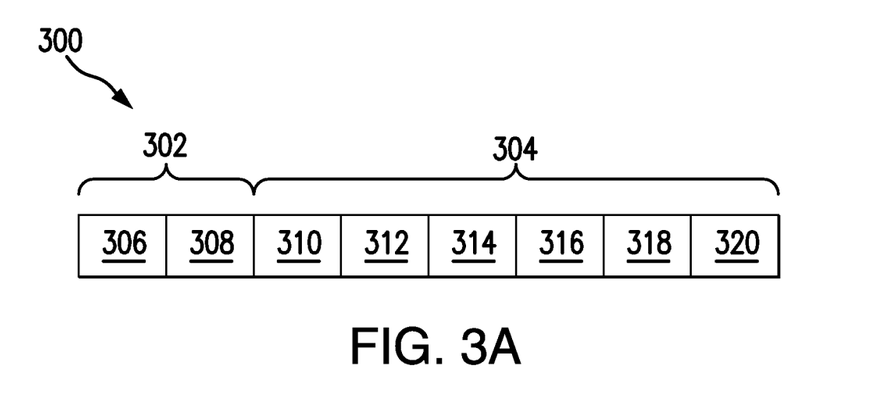
FIG. 3A is a diagram of a conventional data structure that may be used for a BGP extended community attribute, the BGP extended community attribute including a type field and a value field.
Figure 3B:
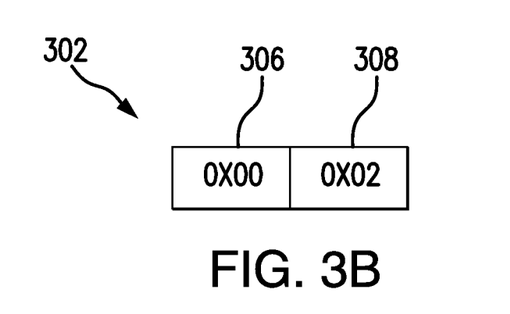
FIG. 3B is a diagram of the type field shown in FIG. 3A.

FIG. 3A shows a conventional data structure 300 for a BGP extended communities attribute that may be utilized by various embodiments of the present invention. The extended community is an 8-octet quantity including a type field 302 comprised of two octets and a value field 304 comprised of six octets 310-320. The type field 302 includes a high-order octet 306 and a low-order octet 308. FIG. 3B shows the type field 302 with exemplary values in the high-order and low-order octets, 306, 308. Here, in FIG. 3B, the value stored in the high-order octet 306 is 0x00 and the value stored in the low-order octet 308 is 0x02. These exemplary values illustrate an exemplary route target community.

In summary, various embodiments of the present invention contemplate matching VPN traffic to managed objects. In one aspect, software programming code embodying the present invention provides to a network managing platform an ability to automatically keep the configuration of the VPN sites in sync with their network configuration. In another aspect, for each new VPN site, a corresponding new VPN managed object is created specific to the characteristics of the received BGP routing information associated with the new VPN site.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
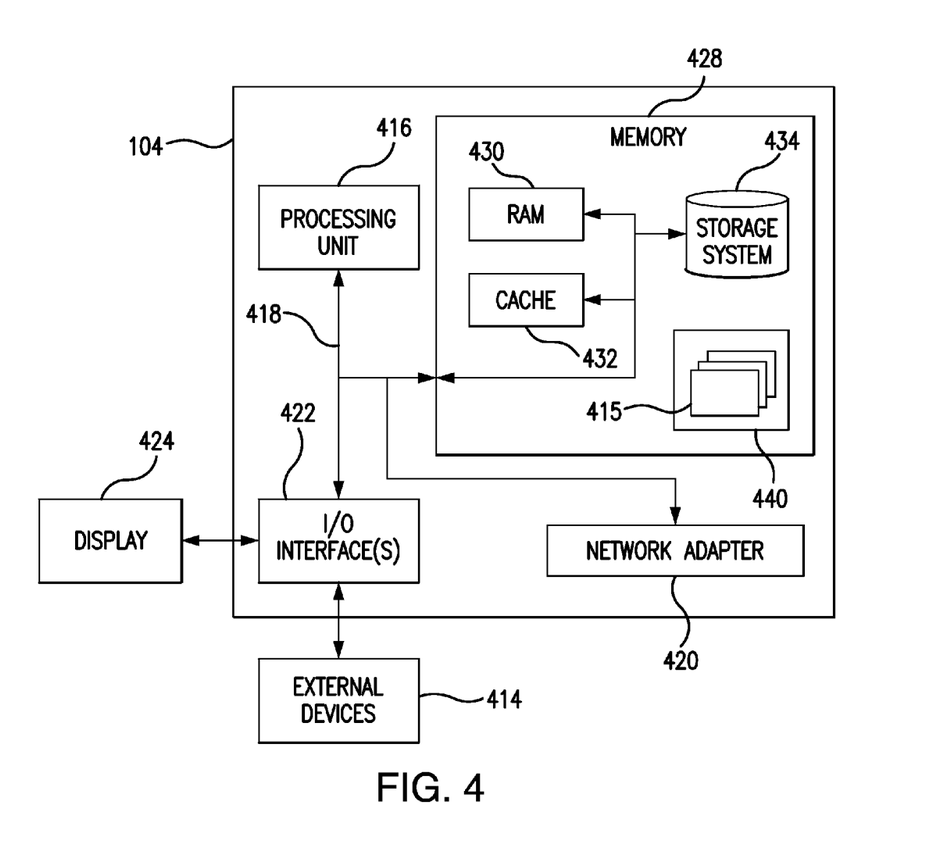
FIG. 4 is a block diagram illustrating a typical network management server that may be employed to implement processing functionality described herein, according to some embodiments.

Embodiments of network management system may be implemented or executed by centralized network management servers comprising one or more computer systems. One such network management server 104 is illustrated in FIG. 4. In various embodiments, network management server 104 may be a server, a mainframe computer system, a workstation, a network computer, a desktop computer, a laptop, or the like.

Network management server 104 is only one example of a suitable system and is not intended to suggest any limitation as to the scope of use or functionality of embodiments of the invention described herein. Regardless, network management server 104 is capable of being implemented and/or performing any of the functionality set forth hereinabove.

Network management server 104 may be described in the general context of computer system-executable instructions, such as program modules, being executed by a computer system. Generally, program modules may include routines, programs, objects, components, logic, data structures, and so on that perform particular tasks or implement particular abstract data types. Network management server 104 may be practiced in distributed data processing environments where tasks are performed by remote processing devices that are linked through a communications network. In a distributed data processing environment, program modules may be located in both local and remote computer system storage media including memory storage devices.

Network management server 104 is shown in FIG. 4 in the form of a general-purpose computing device. The components of network management server 104 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Network management server 104 typically includes a variety of computer system readable media. Such media may be any available media that is accessible by network management server 104, and it includes both volatile and non-volatile media, removable and non-removable media.

System memory 428 can include computer system readable media in the form of volatile memory, such as random access memory (RAM) 430 and/or cache memory 432. Network management server 104 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 415, such as NMS and GUI, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 415 generally carry out the functions and/or methodologies of embodiments of the invention as described herein.

Network management server 104 may also communicate with one or more external devices 414 such as a keyboard, a pointing device, a display 424, etc.; one or more devices that enable a user to interact with network management server 104; and/or any devices (e.g., network card, modem, etc.) that enable network management server 104 to communicate with one or more other computing devices. Such communication can occur via Input/Output (I/O) interfaces 422. Still yet, network management server 104 can communicate with one or more networks such as a local area network (LAN), a general wide area network (WAN), and/or a public network (e.g., the Internet) via network adapter 420. As depicted, network adapter 420 communicates with the other components of network management server 104 via bus 418. It should be understood that although not shown, other hardware and/or software components could be used in conjunction with network management server 104. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically detecting Virtual Private Network (VPN) sites, the method comprising:
   receiving a border gateway protocol (BGP) message from a provider edge router, wherein the BGP message includes one or more attributes and wherein the one or more attributes include an extended community attribute; and
   identifying the VPN site based on the one or more attributes and wherein identifying the VPN site further comprises:
      determining whether the extended community attribute denotes a route target community;
      analyzing a previously created set of VPN site managed objects to determine whether any of the VPN site managed objects match the denoted route target community;
      determining whether the extended community attribute denotes a site of origin community, in response to determining that the denoted route target community matches any of the VPN site managed objects;
      identifying the VPN site based on the site of origin community, in response to determining that the extended community attribute denotes the site of origin community;
      determining whether a route target detection is enabled, in response to determining that the extended community attribute does not denote the site of origin community;
      identifying the VPN site based on the route target community attribute, in response to determining that the route target detection is enabled;
      determining whether a next hop detection is enabled, in response to determining that the route target detection is not enabled;
      determining whether addresses represented by next hop attribute values are reachable;
      identifying a plurality of routes having matching next hop attribute values, for each reachable next hop attribute value;
      determining whether the identified VPN site is already configured; and
      generating a new VPN site managed object that matches the extended community attribute included in the received BGP message.

2. The method of claim 1, wherein the extended community attribute includes a type field.

3. The method of claim 2, wherein receiving the BGP message further comprises determining a type of the extended community attribute message present in the received BGP message based on the type field of the extended community attribute.

4. A computer program product for automatically detecting Virtual Private Network (VPN) sites, the computer program product comprising:
   one or more non-transitory computer-readable storage devices and a plurality of program instructions stored on at least one of the one or more computer-readable storage devices, the plurality of program instructions comprising:
   program instructions to receive a border gateway protocol (BGP) message from a provider edge router, wherein the BGP message includes one or more attributes and wherein the one or more attributes include an extended community attribute; and
   program instructions to identify the VPN site based on the one or more attributes, wherein the program instructions to identify the VPN site further comprise:
      program instructions to determine whether the extended community attribute denotes a route target community;
      program instructions to analyze a set of VPN site managed objects to determine whether any of the VPN site managed objects match the denoted route target community;
      program instructions to determine whether the extended community attribute denotes a site of origin community, in response to determining that the denoted route target community matches any of the VPN site managed objects;
      program instructions to identify the VPN site based on the site of origin community, in response to determining that the extended community attribute denotes the site of origin community;
      program instructions to determine whether a route target detection is enabled, in response to determining that the extended community attribute does not denote the site of origin community;
      program instructions to identify the VPN site based on the route target community attribute, in response to determining that the route target detection is enabled;
      program instructions to determine whether a next hop detection is enabled, in response to determining that the route target detection is not enabled;
      program instructions to determine whether addresses represented by next hop attribute values are reachable;
      program instructions to identify a plurality of routes having matching next hop attribute values, for each reachable next hop attribute value;
      program instructions to determine whether the identified VPN site is already configured; and
      program instructions to generate a new VPN site managed object that matches the extended community attribute included in the received BGP message.

5. The computer program product of claim 4, wherein the extended community attribute includes a type field.

6. The computer program product of claim 5, wherein the program instructions to receive the BGP message further comprise program instructions to determine a type of the extended community attribute message present in the received BGP message based on the type field of the extended community attribute.

7. A computer system for automatically detecting Virtual Private Network (VPN) sites, the computer system comprising one or more processors, one or more computer-readable storage devices, and a plurality of program instructions stored on at least one of the one or more storage devices for execution by at least one of the one or more processors, the plurality of program instructions comprising:
  program instructions to receive a border gateway protocol (BGP) message from a provider edge router, wherein the BGP message includes one or more attributes and wherein the one or more attributes include an extended community attribute; and
  program instructions to identify the VPN site based on the one or more attributes, wherein the program instructions to identify the VPN site further comprise:
    program instructions to determine whether the extended community attribute denotes a route target community; and
    program instructions to analyze a set of VPN site managed objects to determine whether any of the VPN site managed objects match the denoted route target community;
    program instructions to determine whether the extended community attribute denotes a site of origin community, in response to determining that the denoted route target community matches any of the VPN site managed objects;
    program instructions to identify the VPN site based on the site of origin community, in response to determining that the extended community attribute denotes the site of origin community;
    program instructions to determine whether a route target detection is enabled, in response to determining that the extended community attribute does not denote the site of origin community;
    program instructions to identify the VPN site based on the route target community attribute, in response to determining that the route target detection is enabled;
    program instructions to determine whether a next hop detection is enabled, in response to determining that the route target detection is not enabled;
    program instructions to determine whether addresses represented by next hop attribute values are reachable; and
    program instructions to identify a plurality of routes having matching next hop attribute values, for each reachable next hop attribute value; and
    program instructions to determine whether the identified VPN site is already configured; and
    program instructions to generate a new VPN site managed object that matches the extended community attribute included in the received BGP message.

8. The computer system of claim 7, wherein the extended community attribute includes a type field.

9. The computer system of claim 8, wherein the program instructions to receive the BGP message further comprise program instructions to determine a type of the extended community attribute message present in the received BGP message based on the type field of the extended community attribute.

* * * * *